(12) United States Patent
Kudo

(10) Patent No.: US 12,175,828 B2
(45) Date of Patent: Dec. 24, 2024

(54) GAMING MACHINE

(71) Applicant: OMRON CORPORATION, Kyoto (JP)

(72) Inventor: Takuya Kudo, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 232 days.

(21) Appl. No.: 17/889,453

(22) Filed: Aug. 17, 2022

(65) Prior Publication Data

US 2023/0082815 A1    Mar. 16, 2023

(51) Int. Cl.
*G07F 17/32* (2006.01)
*F21V 8/00* (2006.01)

(52) U.S. Cl.
CPC ......... *G07F 17/3209* (2013.01); *G02B 6/003* (2013.01); *G02B 6/0036* (2013.01); *G02B 6/006* (2013.01); *G07F 17/3216* (2013.01); *G02B 6/0068* (2013.01); *G07F 17/3211* (2013.01)

(58) Field of Classification Search
CPC ............ G07F 17/3209; G07F 17/3216; G07F 17/3211; G02B 6/003; G02B 6/0036; G02B 6/006; G02B 6/0068; G02B 6/0018
USPC .......................................................... 463/30
See application file for complete search history.

(56) References Cited

U.S. PATENT DOCUMENTS

| | | | |
|---|---|---|---|
| 9,126,113 B2 | 9/2015 | Johnson et al. | |
| 10,279,246 B2 | 5/2019 | Sakamoto et al. | |
| 2007/0010318 A1 | 1/2007 | Rigsby et al. | |
| 2009/0179597 A1 | 7/2009 | Salmon | |
| 2011/0269543 A1 | 11/2011 | Johnson et al. | |
| 2011/0319152 A1 | 12/2011 | Ross et al. | |
| 2013/0130796 A1 | 5/2013 | Johnson et al. | |
| 2015/0371486 A1 | 12/2015 | Castro et al. | |
| 2016/0154170 A1 | 6/2016 | Thompson et al. | |
| 2017/0178444 A1 | 6/2017 | Lee et al. | |

(Continued)

FOREIGN PATENT DOCUMENTS

JP    2020-39813 A    3/2020

OTHER PUBLICATIONS

An US Office Action issued on Mar. 18, 2024 in a related U.S. Appl. No. 17/888,527.

(Continued)

*Primary Examiner* — Pierre E Elisca
(74) *Attorney, Agent, or Firm* — METROLEX IP LAW GROUP, PLLC; Robert L. Scott, Esq.

(57) ABSTRACT

A gaming machine according to the first invention comprises a housing, an operation button for a gaming machine provided in a front position opposite a game player in the housing and a display device disposed at a position adjacent to the operation button for the gaming machine in the housing. The push button 20 includes a base 21, a key top 22, an LED 30, and a light guide plate 31. The key top 22 is supported by the base 21 in a state of being operable by a player, has a front surface 22a that is visible to the player and a back surface 22b on the opposite side thereof, and transmits light. The LED 30 is provided on the back surface 22b side of the key top 22 and emits light in a desired direction. The light guide plate 31 has a lower surface 31a that is provided on the back surface 22b side of the key top 22 and on which the light emitted from the LED 30 is incident, and an upper surface 31b that emits light toward the key top 22 side.

10 Claims, 10 Drawing Sheets

(56) References Cited

U.S. PATENT DOCUMENTS

| | | | |
|---|---|---|---|
| 2017/0243759 A1 | 8/2017 | Jintyou et al. | |
| 2018/0082519 A1* | 3/2018 | Hughes | G07F 17/3209 |
| 2018/0314416 A1 | 11/2018 | Powderly et al. | |
| 2020/0090882 A1 | 3/2020 | Sumi et al. | |
| 2022/0398894 A1* | 12/2022 | Randel | G07F 17/3211 |
| 2023/0282067 A1* | 9/2023 | Maya | G07F 17/34 463/13 |
| 2023/0377413 A1* | 11/2023 | Shepherd | G07F 17/323 |
| 2023/0410602 A1* | 12/2023 | Peterson | G07F 17/3267 |
| 2024/0194017 A1* | 6/2024 | Chong | G07F 17/323 |
| 2024/0221461 A1* | 7/2024 | Bergant | G07F 17/3225 |
| 2024/0249588 A1* | 7/2024 | Shepherd | G07F 17/3211 |

OTHER PUBLICATIONS

U.S. Office Action issued on Aug. 15, 2024 in a related U.S. Appl. No. 17/888,527.

* cited by examiner

GAMING MACHINE

CROSS-REFERENCE TO RELATED APPLICATIONS

This application claims priority to Japanese Patent Application No. 2021-149812 filed on Sep. 15, 2021. The entire disclosure of Japanese Patent Application No. 2021-149812 is hereby incorporated herein by reference.

BACKGROUND

Technical Field

The present invention relates to a gaming machine installed in a gaming facilities, for example.

Description of the Related Art

Slot machines and other such gaming machines manufactured by various gaming machine makers are installed in casinos and other such gaming facilities. A player who has entered a game facility selects a preferred gaming machine from among those installed, and plays a game. It is therefore important that the gaming machine be more appealing than other models, so that the player will want to play more.

With a gaming machine such as this, the game is played by the player by directly operating an operation unit provided on the front of the gaming machine facing the player. Therefore, the operation unit is an important component of appealing to the player.

The operation unit includes push buttons (gaming machine push buttons) that are pressed by the player while playing the gaming machine. One way to make the operation unit, including the push buttons, more appealing is to install transparent push buttons on the display device, the light emitting unit, or the like provided to the operation unit, so that a design is displayed through the push buttons to match the playing state of the gaming machine.

For instance, Patent Literature 1 discloses the configuration of a gaming machine comprising a push button switch that is disposed on the right side as viewed by a player in an operation deck installed on the front of a slot machine or other such gaming machine, and a touch panel type of liquid crystal display device (LCD (liquid crystal display) that is disposed on the left side.

CITATION LIST

Patent Literature

Patent Literature 1: JP-A 2020-39813

SUMMARY

Problem to be Solved by the Invention

However, the following problem is encountered with the above-mentioned conventional push button for a gaming machine.

With the push button for a gaming machine disclosed in the above-mentioned document, a liquid crystal display device, which is disposed adjacently as a display device for displaying a design or the like in order to make the push button switch more appealing, is disposed extending into the space under the push button switch.

With this configuration, the liquid crystal display device ends up being larger, which contributes to higher cost of the gaming machine.

It is an object of the present invention to provide a gaming machine with which the cost of the gaming machine can be reduced as compared with a conventional machine.

Means for Solving Problem

A gaming machine according to the first invention comprises a housing, an operation button for a gaming machine provided in a front position opposite a game player in the housing and a display device disposed at a position adjacent to the operation button for the gaming machine in the housing. The operation button for the gaming machine includes a base, a main body, a light source, and a light guide plate. The main body is supported by the base in a state of being operable by a player, has a first surface that is visible to the player and a second surface on the opposite side from the first surface, and transmits light. The light source is provided on the second surface side of the main body and emits light in a desired direction. The light guide plate is provided on the second surface side of the main body and has an incident surface on which light emitted from the light source is incident, and an emission surface from which light is emitted to the main body side.

Here, in the operation button for a slot machine or other such gaming machine provided on the operation deck of a slot machine or other such gaming machine, the main body that is operated by the player is optically transmissive and is supported by the base. A light guide plate that emits light toward the main body, and a light source that causes light to be incident on the light guide plate are disposed below the main body (on the second surface side).

Here, the operation button for a gaming machine is, for example, a push button switch, and performs operations such as displaying a design (text, numbers, pictures, etc.), imparting vibration, and lighting or flashing, according to the situation during play of the gaming machine.

Also, the light guide plate provided below the main body (on the second surface side) emits light toward the main body so that different designs are displayed depending on the direction in which the light emitted from the light source is incident, for example.

The light source is an LED (light emitting diode), for example, and emits light toward the lower surface or the side surface (incident surface) of the light guide plate.

Consequently, a design or the like can be displayed on the surface of the main body of the gaming machine operation button with a simpler configuration than with a configuration in which the liquid crystal display device is provided below the main body (on the second surface side).

As a result, it is possible to provide a gaming machine with which the cost of the gaming machine can be reduced as compared with a conventional machine.

The gaming machine according to the second invention is the gaming machine according to the first invention, wherein the light guide plate further has an upper surface that is opposite the second surface of the main body, and a lower surface that is on the opposite side from the upper surface. The light source is disposed on the lower surface side of the light guide plate.

Here, the light source is disposed below the main body operated by the player (on the second surface side), on the lower surface side of the light guide plate disposed at a position opposite the main body.

Consequently, light from the light source can be incident toward the lower surface of the light guide plate, so the size in the width direction of the operation button for a gaming machine can be smaller than that in a configuration in which the light source causes the light to be incident from the side surface of the light guide plate.

As a result, the light source can be disposed a position closer to the liquid crystal display device or the like disposed at a position adjacent to the operation deck of the gaming machine, for example.

The gaming machine according to the third invention is the gaming machine according to the first or second invention, wherein the light guide plate further has a plurality of prisms that are arranged in a specific pattern on either the upper surface or the lower surface, and that reflect the light emitted from the light source onto the incident surface in a specific direction.

Here, the light guide plate has a plurality of prisms formed in a specific pattern so as to reflect the light emitted from the light source toward the incident surface in a specific direction in order to display a design or the like on the surface of the main body.

Consequently, the light incident on the incident surface from the light source is reflected by the prisms in the interior of the light guide plate and emitted from the emission surface, allowing a design or the like to be displayed on the surface of the main body.

The gaming machine according to the fourth invention is the gaming machine according to the third invention, wherein the plurality of prisms have a plurality of patterns so as to switch the design displayed on a surface of the main body according to the incident direction of the light emitted from the light source.

Here, the prisms are provided with a different pattern for each direction in which the light is incident.

Consequently, the light source that emits the light incident on the light guide plate can be switched, for example, to switch the direction of the light incident on the light guide plate, allowing different designs to be displayed on the surface (first surface) of the main body of the gaming machine operation button.

The gaming machine according to the fifth invention is the gaming machine according to any of the first to fourth inventions, wherein the light guide plate further has chamfered portions that are formed along the sides of the upper surface, reflect the light emitted from the light source, and guide the reflected light so as to diffuse the light between the upper surface and the lower surface.

Here, if the light guide plate is substantially quadrangular, for example, the chamfered portions are provided along the four sides of the upper surface, so that the light incident from the lower surface side is diffused in the interior of the light guide plate.

Consequently, in a configuration in which the light source is disposed on the lower surface side of the light guide plate, the light can be sufficiently diffused inside the light guide plate, and substantially uniform light can be emitted from the upper surface.

The gaming machine according to the sixth invention is the gaming machine according to any of the first to fifth inventions, further comprising a lens portion that is disposed between the light source and the lower surface of the light guide plate, and that guides the light emitted from the light source from the lower surface side of the light guide plate toward the chamfered portions.

Here, a lens portion that guides the light emitted from the light source disposed on the lower surface side of the light guide plate toward the chamfered portions formed along the four sides of the substantially quadrangular light guide plate is provided between the light guide plate and the light source.

Here, the lens unit is, for example, a collimator lens that converts incident light into parallel light.

Consequently, the light sent toward the chamfered portions formed on the light guide plate by the lens portion is reflected into the light guide plate by the inclined surfaces of the chamfered portions, and diffused inside the light guide plate, after which the light can be emitted in a substantially uniform state from the emission surface (upper surface).

The gaming machine according to the seventh invention is the gaming machine according to any of the first to sixth inventions, further comprising a substrate that has a first surface on which the light source is installed, and that is disposed so as to be opposite the lower surface of the light guide plate.

Here, the light source disposed on the lower surface side of the light guide plate is provided on the substrate disposed so as to be opposite the lower surface of the light guide plate.

Consequently, the substrate on which the light source is provided can be disposed on the lower surface side rather than to the side of the light guide plate, so the size of the gaming machine operation button in the width direction can be reduced.

The gaming machine according to the eighth invention is the gaming machine according to any of the first to seventh inventions, wherein the main body is supported by the base in a state that allows a transition from an initial state to a pressed state when the main body is pressed down with respect to the base.

Here, a push button that transitions from the initial state to the pressed-down state when pressed down with respect to the base is used as the operation button for a gaming machine.

Consequently, the above-mentioned effect can also be obtained when the gaming machine operation button is constituted by a push button.

The gaming machine according to the ninth invention is the gaming machine according to the eighth invention, further comprising a spring member that is provided between the base and the main body, and that returns the main body that has been pressed down with respect to the base from the pressed-down state to the initial state.

Here, in a push button type of gaming machine operation button, a spring member for returning the main body pressed down with respect to the base from the pressed-down state to the initial state is provided between the base and the main body.

Consequently, the push button is easier to operate by the player because the main body pressed down with respect to the base is returned to its initial state by the urging force of the spring member.

The gaming machine according to the tenth invention is the gaming machine according to any of the first to ninth inventions, wherein a display device is a liquid crystal display (LCD).

Here, a liquid crystal display device is provided as the display device disposed adjacent to the operation button for a gaming machine in the operation deck for a gaming machine.

Consequently, the liquid crystal display device and the gaming machine operation button can be disposed at positions closer together.

Effects

With the gaming machine according to the present invention, the cost of the gaming machine can be reduced as compared with that of a conventional machine.

DETAILED DESCRIPTION

Figure 1:
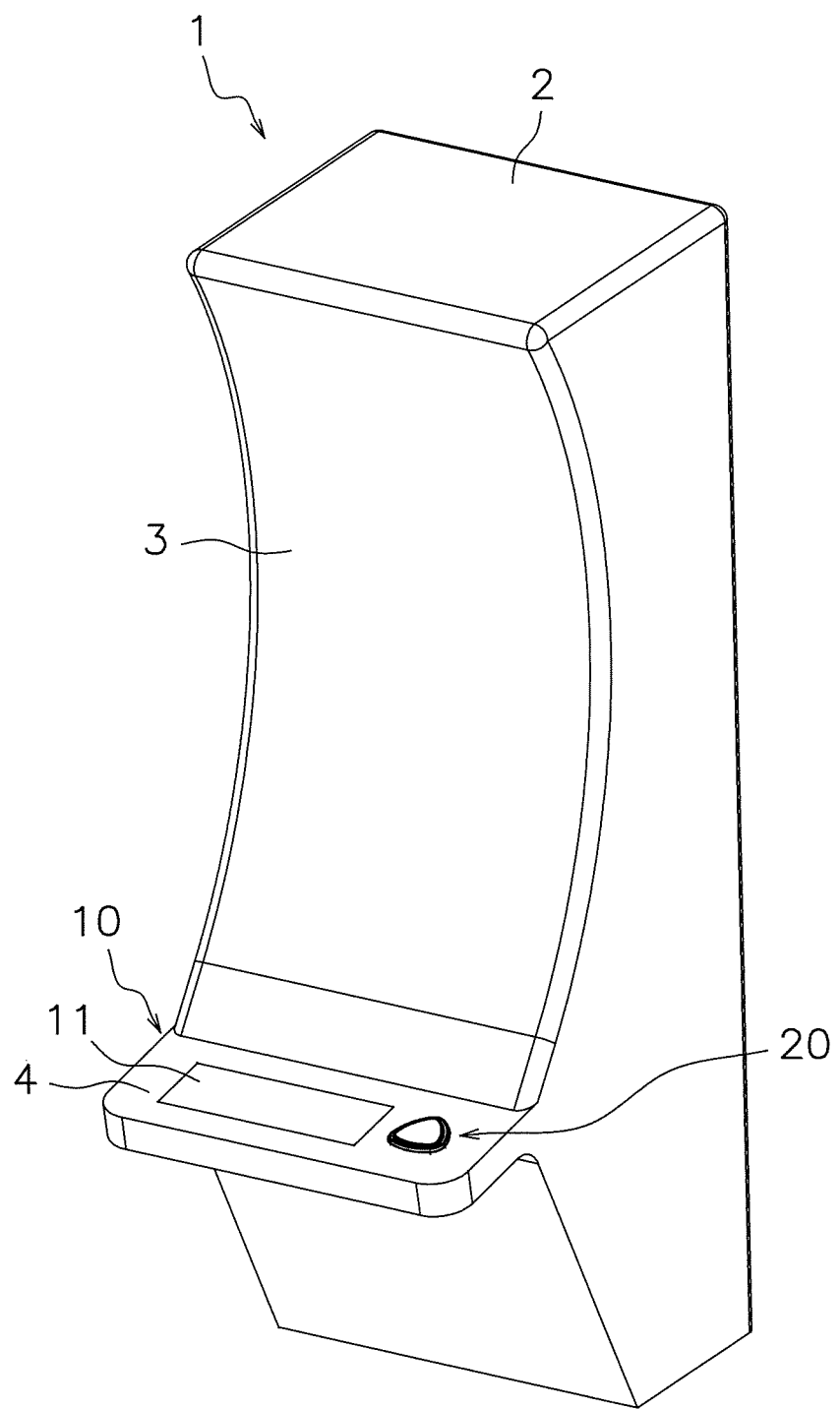
FIG. 1 is an overall oblique view of the configuration of a gaming machine in the push button for a gaming machine according to an embodiment of the present invention has been installed.

A gaming machine 1 and an operation deck 10 comprising the push button (operation button for a gaming machine) 20 according to an embodiment of the present invention will be described below with reference to FIGS. 1 to 9B.

Expressions related to direction, such as "upper" and "lower," appearing in the following description refer to "upper" and "lower" in the drawings used in the description, and are not intended to limit the invention.

(1) Configuration of Gaming Machine 1

As shown in FIG. 1, the gaming machine 1 according to this embodiment is, for example, a slot machine, and comprises a housing 2, a display monitor 3, and the operation deck 10.

The housing 2 constitutes the outer shape of the gaming machine 1 and has a substantially cuboid shape that is oriented vertically. The housing 2 is provided with the display monitor 3 at a position corresponding to the height of the player's line of sight at the front of the gaming machine 1 facing the player who is playing the game. The housing 2 is also provided with the operation deck 10, which the player uses to input operations, at a position below the display monitor 3, at a position on the front side facing the player.

The display monitor 3 displays, for example, a plurality of reels that turn and stop at the operation of the player, with the outcome determined by the combination of symbols shown on the reels when the reel is stopped by the operation of the player. Consequently, the gaming machine 1 awards a prize according to the outcome determined by the combination of symbols shown on the stopped reels.

In this reel display, images corresponding to the reels may be displayed on a liquid crystal display screen or the like, or reels provided as a rotating bodies may themselves be disposed on the display monitor 3.

The operation deck 10 is provided on the upper surface of the portion of the lower part of the housing 2 that protrudes toward the player. As shown in FIG. 1, the operation deck 10 is provided with an LCD (liquid crystal display; display device) 11 and a push button 20. Also, a transparent plate 4 is provided on the upper surface of the operation deck 10.

(2) Configuration of Operation Deck 10

Figure 2:
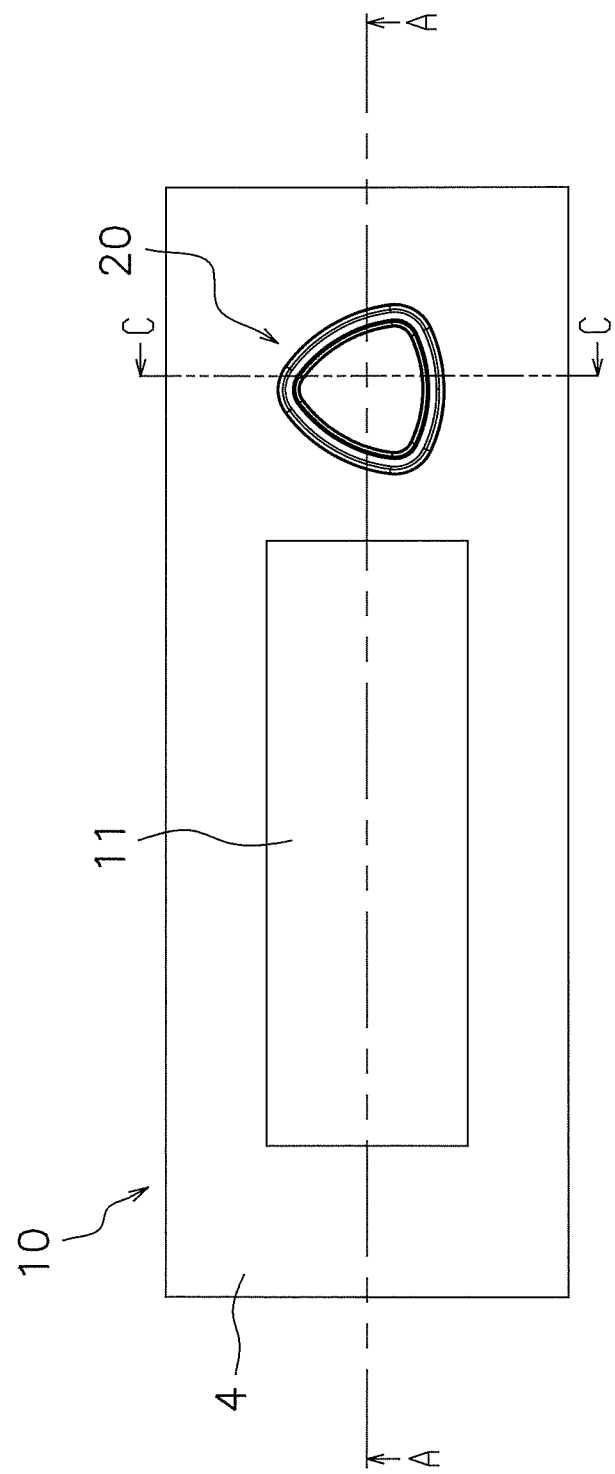
FIG. 2 is a top view of the configuration of an operation deck installed at the front of the gaming machine in FIG. 1.

As shown in FIG. 2, the operation deck 10 has a rectangular upper surface in plan view, and this upper surface is covered with the transparent plate 4. Also, the LCD 11 is disposed from the center to the left side on the upper surface of the operation deck 10, and the push button 20 is disposed on the right side.

The transparent plate 4 covers the surface of the LCD 11, and the push button 20 is fitted into an opening formed to match the installation position of the push button 20.

Figure 3:
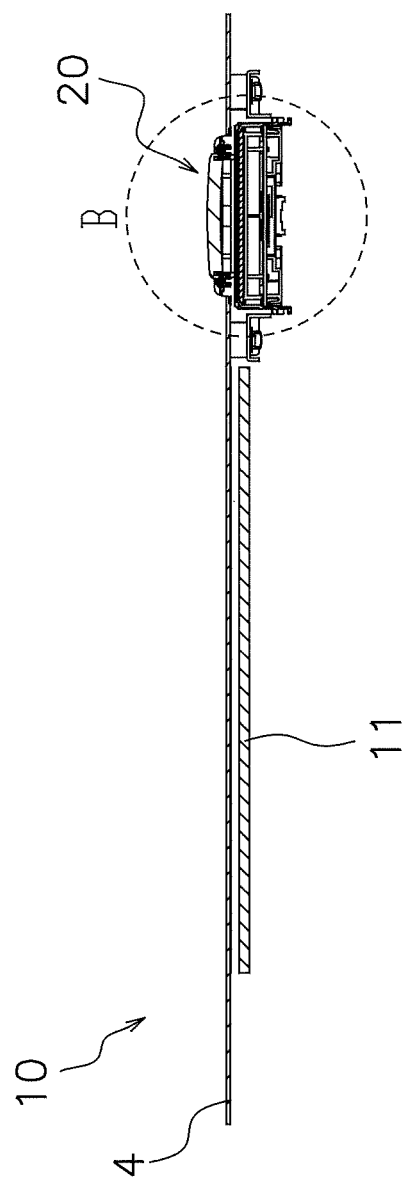
FIG. 3 is a cross-sectional view taken along the A-A line of the operation deck in FIG. 2.

As shown in FIG. 3, the LCD 11 is, for example, a touch panel type of liquid crystal display device, and receives operation inputs from a player who is playing the gaming machine 1. In this embodiment, an operation of designating the number of bets from a player playing a slot machine, an operation of rotating the reels, or the like is inputted to the LCD 11, for example.

Also, as shown in FIG. 3, the LCD 11 is disposed at a position close to the push button 20, which is disposed adjacent to the right side, in the lower space of the transparent plate 4.

The push button 20 is an example of an operation button for a gaming machine included in the operation deck 10 of the gaming machine 1. For example, when starting the rotation of the reels displayed on the display monitor 3, this button is pressed by the player who is playing the slot machine. The detailed configuration of the push button 20 will be described in detail below.

(3) Configuration of Push Button 20

Figure 4:
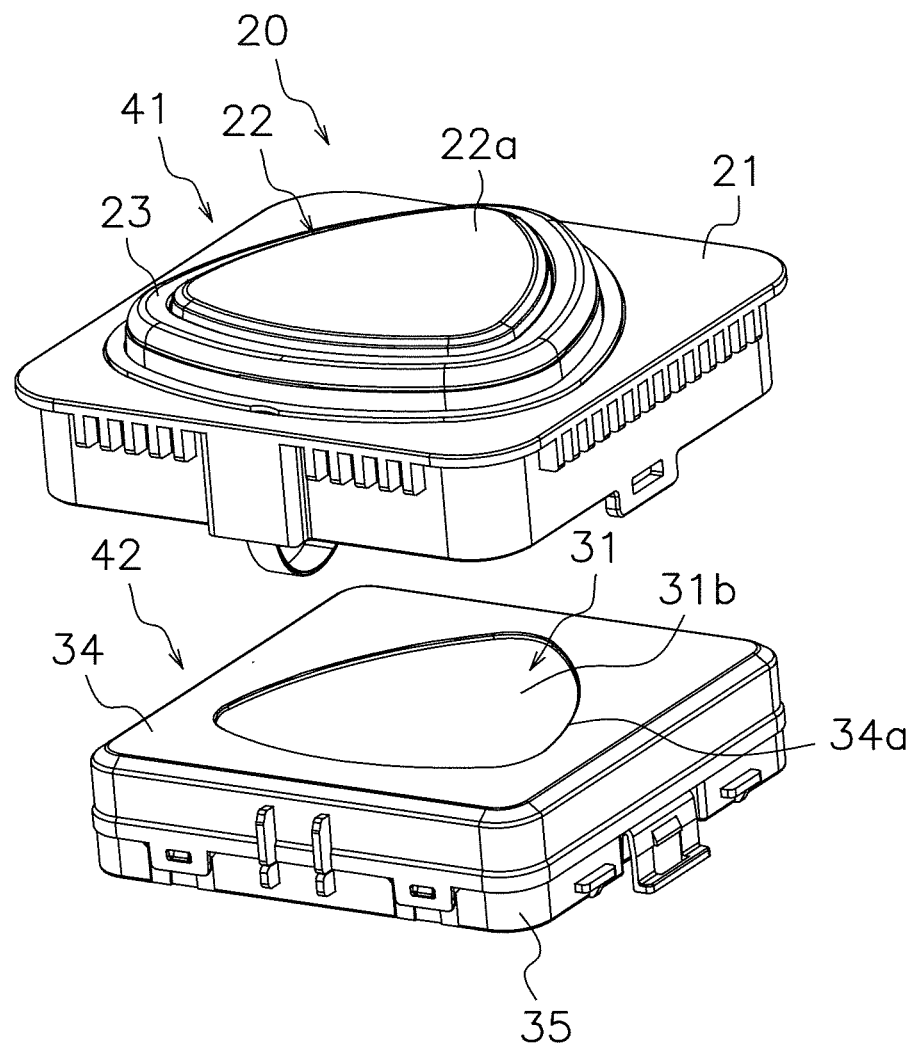
FIG. 4 is an exploded oblique view showing two units constituting a push button disposed on the right side of the operation deck in FIG. 2.

As shown in FIG. 2, the push button 20 is a push button switch having a substantially triangular outer shape in plan view. As shown in FIG. 4, the push button 20 is configured such that a button unit 41 disposed at the upper part and a display unit 42 disposed at the lower part are next to one another in the vertical direction.

The button unit 41 functions as a push button switch of the push button 20, and is provided at a position that is exposed on the surface of the operation deck 10 of the gaming machine 1.

The display unit 42 is a unit having a display function for displaying a design or the like on the surface of the push button 20, and is fixed so as to be fitted on the lower surface side of the button unit 41. The display unit 42 switches between various displays, such as displaying a design on the surface of the push button 20, or turning on the light or making it blink, according to the state of play of the gaming machine 1.

The configuration of the push button 20 will now be described in further detail.

First, the configuration on the button unit 41 side will be described.

Figure 5:
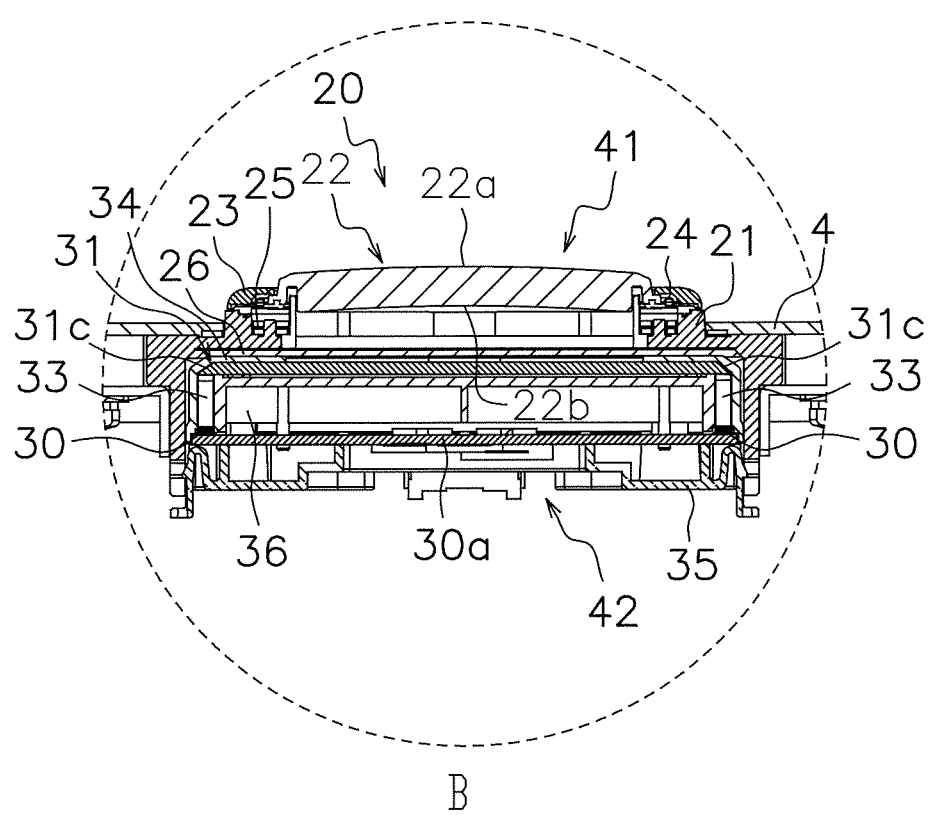
FIG. 5 is a detail view of the B portion, showing the push button disposed on the right side of the operation deck in FIG. 3.
Figure 6:
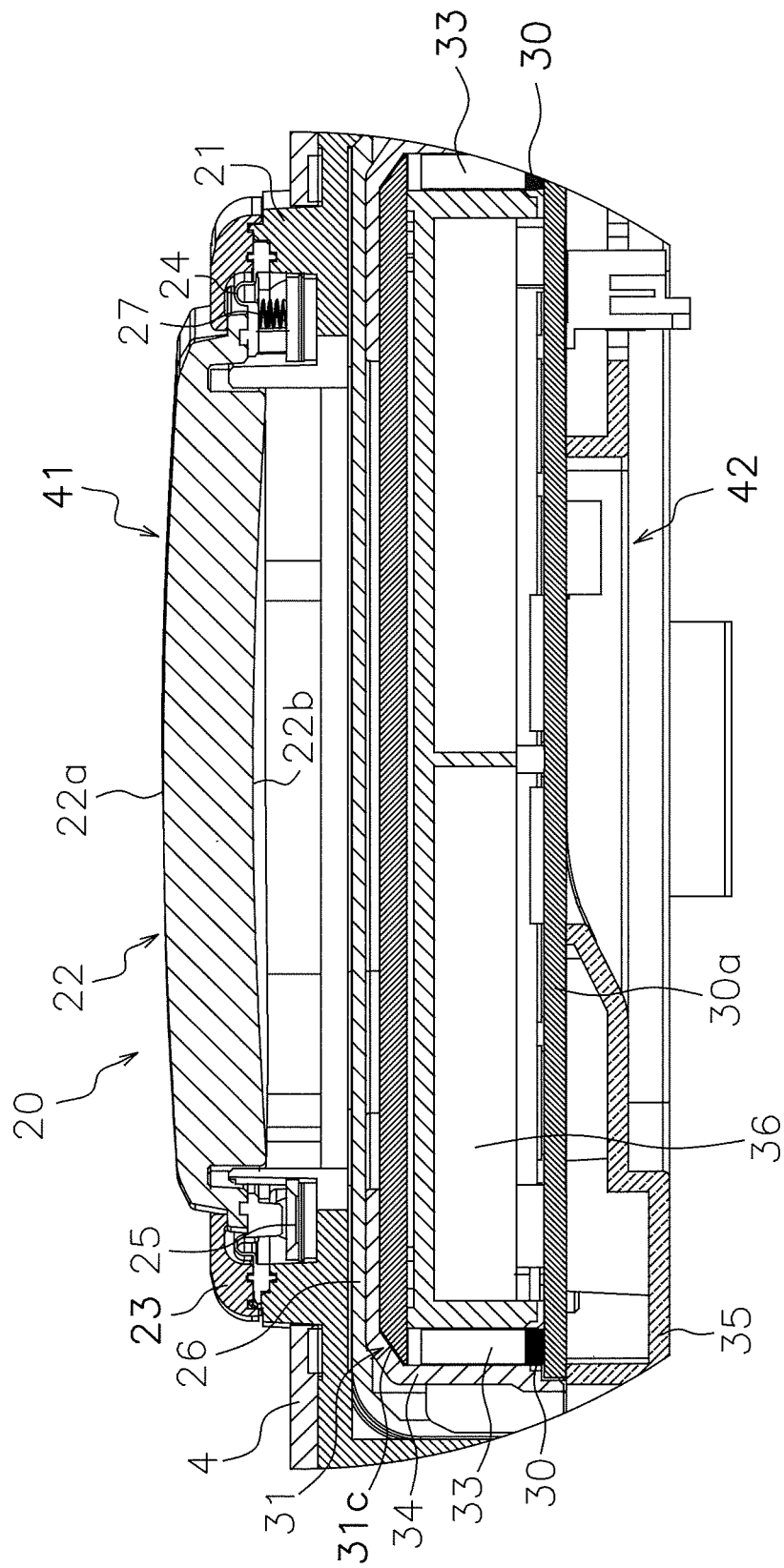
FIG. 6 is a cross-sectional view taken along the C-C line showing the configuration of a push button disposed on the right side of the operation deck in FIG. 2.

As shown in FIGS. 5 and 6, the push button 20 comprises a base 21, a key top (main body) 22, a bezel 23, an elastic body 24, a pressing sensor 25, a rear cover 26, and a return spring 27 as the components on the button unit 41 side. Also, as shown in FIGS. 5 and 6, the push button 20 comprises an LED (light source) 30, a light guide plate 31, a prism 32, a collimator lens (lens portion) 33, a front cover 34, a rear cover 35, and a spacer 36 as the components on the display unit 42 side.

The base 21 is a member having a substantially triangular opening in the center, and as shown in FIGS. 5 and 6, supports the key top 22 and the bezel 23 on its upper surface side, and is attached to the upper surface of the operation deck 10.

As shown in FIGS. 5 and 6, the key top 22 has a front surface (first surface) 22*a* that is visible to the player, and a rear surface (second surface) 22*b* on the opposite side from the first surface, and is attached in a state where it can be pressed down with respect to the bezel 23. The key top 22 is a substantially triangular member, and is disposed so as to be fitted on the inside of the base 21, which has a substantially triangular ring shape. Also, the key top 22 is formed from a resin that transmits light in order to display the design displayed on the display unit 42 side (discussed below), turn on the light or make it blink, etc., on the front surface 22*a*.

The bezel 23 is a decorative member with a substantially triangular ring shape that serves as a metallic trim component, and is attached to the upper surface side of the base 21 so as to surround the outer peripheral portion of the key top 22 as shown in FIGS. 5 and 6. The bezel 23 is fixed to the base 21 by screws (not shown) in a state in which the outer peripheral portion of the key top 22 is sandwiched from above and below together with the base 21.

As shown in FIGS. 5 and 6, the elastic body 24 is a flange-shaped portion formed integrally with the key top 22 on the outer peripheral portion of the key top 22. When pressed down by the player, the front surface 22*a* of the key top 22 undergoes elastic deformation and moves the key top 22 downward.

As shown in FIGS. 5 and 6, the pressing sensor 25 is provided between the base 21 and the key top 22, and detects when the key top 22 is pressed down with respect to the base 21. The pressing sensor 25 is provided on each of the three sides of the base 21, which is substantially in the shape of a triangular ring, for example.

The rear cover 26 is a member having a substantially triangular ring shape, and is attached to the base 21 so as to cover the lower surface (back surface) side of the base 21, as shown in FIGS. 5 and 6. The display unit 42 is inserted into and held in the central, substantially triangular ring-shaped opening of the rear cover 26.

The return spring 27 is provided near each of the three vertices of the substantially triangular shape of the key top 22, for example, and as shown in FIG. 6, imparts an upward urging force that returns the key top 22 that has been pressed down with respect to the base 21 from its depressed state to its initial state.

Next, the configuration on the display unit 42 side will be described.

As shown in FIGS. 5 and 6, a plurality of LEDs (light sources) 30 are disposed on the upper surface of the substantially square ring-shaped LED substrate (substrate) 30*a*, and emit light upward in the drawing (toward the lower surface 31*a* side of the light guide plate 31). The light emitted from the LEDs 30 is guided by the collimator lens 33 (discussed below) from the lower surface 31*a* of the light guide plate 31 to the interior of the light guide plate 31, is diffused inside the light guide plate 31, and proceeds from the upper surface 31*b* toward the key top 22 of the button unit 41.

Figure 7:
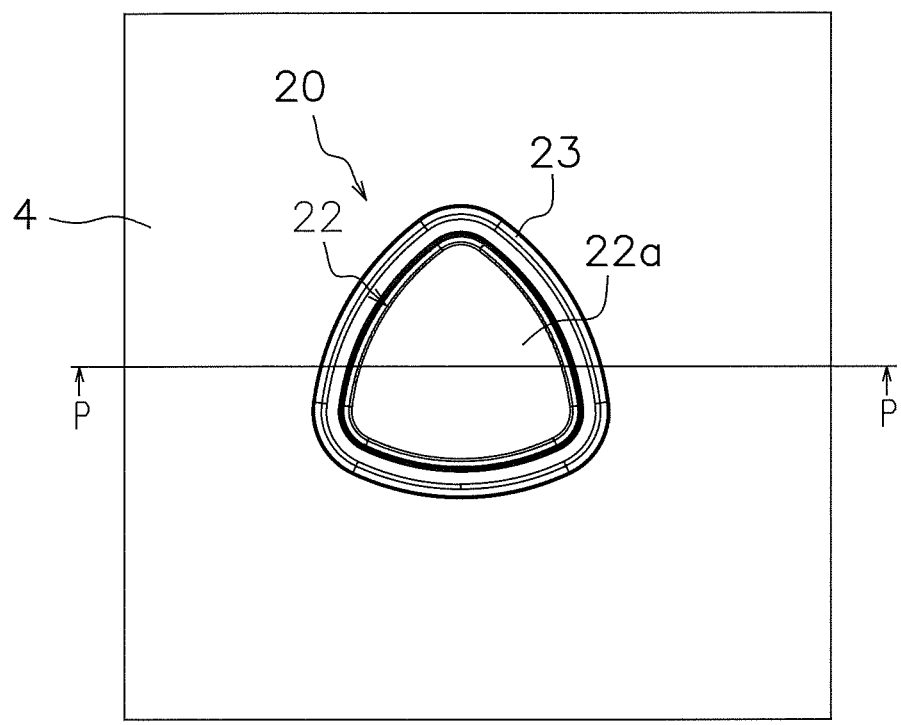
FIG. 7 is a plan view of the push button shown in FIG. 6, etc.

The configuration of the light guide plate 31, the prism 32, the collimator lens 33, and so forth will now be described in detail with reference to FIG. 8, which schematically shows a cross-sectional view along the P—P line in the plan view of the push button 20 shown in FIG. 7, and FIGS. 9A and 9B, which schematically show the configuration of the light guide plate 31.

The light guide plate 31 is a flat member formed from a transparent resin such as polymethyl methacrylate (PMMA), polycarbonate, cycloolefin polymer, or acrylic resin. As shown in FIGS. 5 and 6, the light guide plate 31 is provided below the key top 22 (on the back surface (second surface) 22*b* side) so that at least a part thereof is exposed on the upper surface on the display unit 42 side. As shown in FIG. 8 (see the two-dot chain arrow), the light guide plate 31 diffuses in its interior the light that is incident from the lower surface (incident surface) 31*a*, and emits this light from its upper surface (emission surface) 31*b*, the result being that substantially uniform light is emitted from the upper surface 31*b*.

Figure 9A:
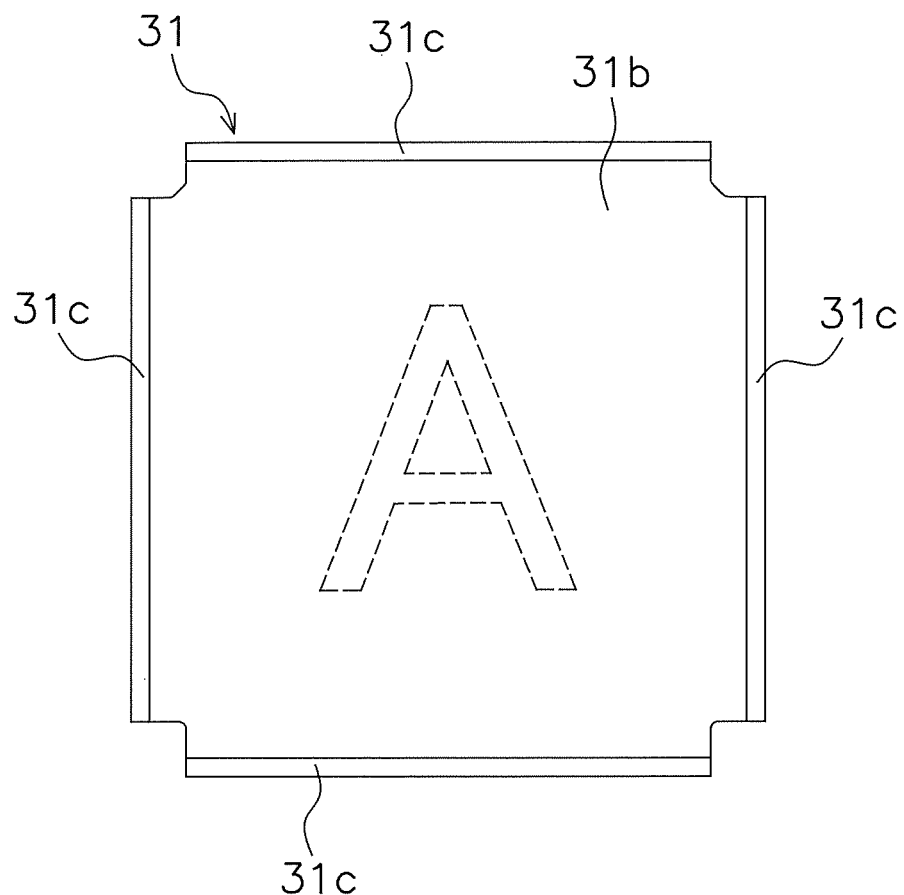
FIGS. 9A and 9B are a plan view and a side view of the configuration of the light guide plate included in the push button in FIG. 8.
Figure 9B:
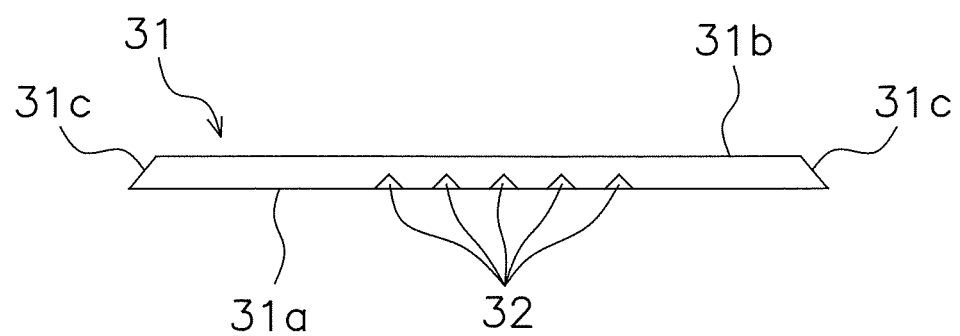

Also, as shown in FIGS. 9A and 9B, a plurality of prisms 32 that reflect the light incident in the interior in a specific direction are formed on the lower surface 31*a* of the light guide plate 31 as a specific pattern according to the design to be displayed by the display unit 42 (in this embodiment, the letter "A"), or the like.

Furthermore, as shown in FIGS. 9A and 9B, chamfered portions 31*c*, consisting of surfaces that are inclined at a specific angle with respect to the upper surface 31*b*, are provided to the outer edge portions where the upper surface 31*b* and the side surfaces of the light guide plate 31 intersect.

As shown in FIG. 9B, the chamfered portions 31*c* are inclined portions formed so as to slope downward from the inner peripheral side toward the outer peripheral side of the light guide plate 31. Consequently, the light that is incident on the light guide plate 31 is reflected on the inclined surfaces of the chamfered portions 31*c* and is diffused within the light guide plate 31 as shown in FIG. 8.

As shown in FIGS. 9A and 9B, the prisms 32 are portions that are finely worked on the lower surface 31*a* side of the light guide plate 31, and reflect the light incident on the light guide plate 31 in a specific direction. Also, the prism 32*s* are disposed so as to be laid out within the range of the design ("A") to be displayed as the display unit 42 when the LED 30 is lit, or the like.

Consequently, a control unit (not shown) of the display unit 42 controls the LED 30 so that light is emitted toward the light guide plate 31 according to the play state of the gaming machine 1, the result being that the desired pattern or the like can be displayed, as viewed from the 31*b* side emission surface side (upper surface). As a result, the key top 22 of the push button 20 is able to transmit light, so the design or the like can also be seen on the surface of the push button 20.

Also, the display unit 42 controls the LED 30 so that light will not be emitted toward the light guide plate 31 according to the play state of the gaming machine 1, which allows control such that the desired design or the like is not displayed, as viewed from the emission surface side (upper surface 31*b* side).

The prisms 32 may be provided in a plurality of patterns that reflect light incident from different directions inside the light guide plate 31.

In this case, since the pattern of the prisms 32 that reflect the light will vary depending on the incidence direction of the light, the design or the like that can be seen from the upper surface (emission surface) 31*b* side can be switched as desired. That is, of the LEDs 30 that emit light toward the guide plate 31, just those LEDs 30 that emit light in the desired direction may be turned on, so that the design or the like the user wants to display can be displayed on the upper surface 31b side.

For example, if the light guide plate 31 has a substantially square shape in plan view, the control for switching the design or the like to be displayed on the emission surface side of the display unit 42 may be accomplished by switching the incidence of light from the LEDs 30 disposed opposite each other on the four side surfaces.

Figure 8:
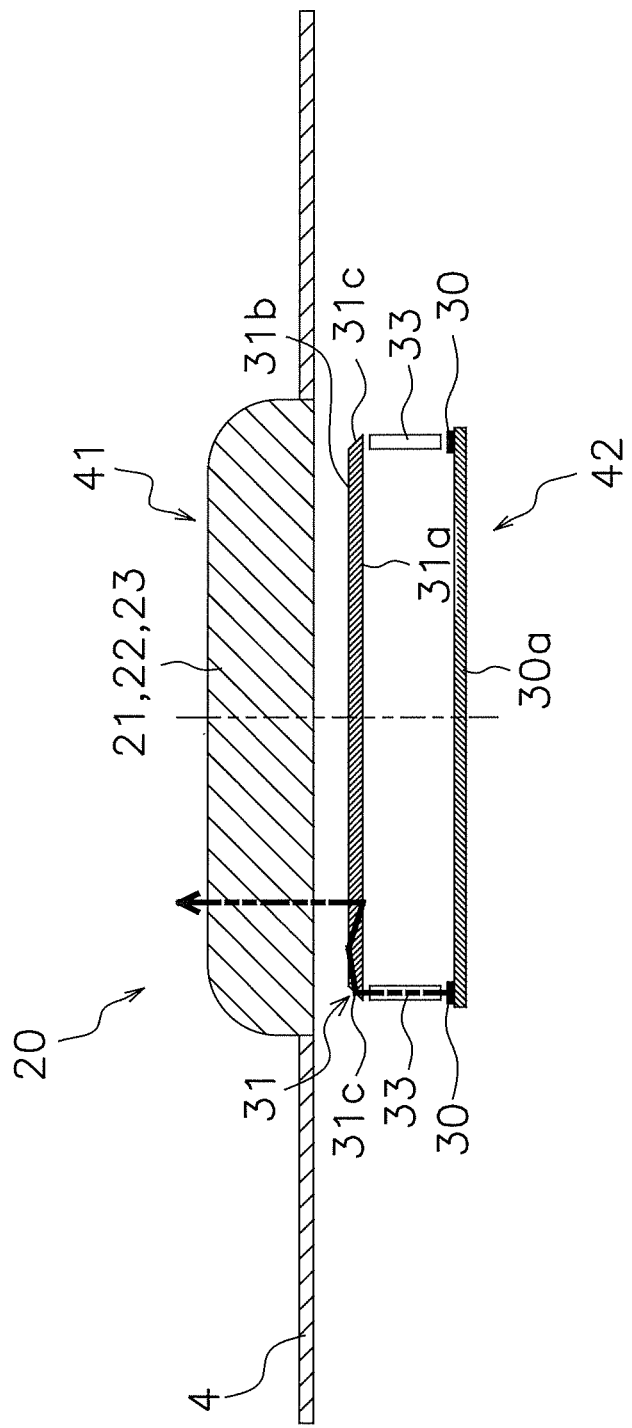
FIG. 8 is a cross-sectional view taken along the P—P line in FIG. 7 and is a schematic view showing the main components of the push button.

The collimator lens (lens unit) 33 is a lens that converts the light emitted from the LEDs 30 into parallel light, and is provided between the LEDs 30 and the lower surface 31a of the light guide plate 31, as shown in FIG. 8. The collimator lens 33 makes the light beams emitted from the LEDs 30 parallel, and guides the resultant light toward the inclined surfaces of the chamfered portions 31c of the light guide plate 31 discussed above. As shown in FIG. 8, the collimator lens 33 has an incident surface that is provided at the lower end portion in the drawing and on which the light emitted from the LEDs 30 is incident, and emission surface that is provided at the upper end portion in the drawing and that emits the parallel light toward the lower surface 31a of the light guide plate 31.

Consequently, the light emitted from the LEDs 30 enters the light guide plate 31 from the lower surface 31a of the light guide plate 31 in the state of being parallel light, is reflected by the inclined surfaces of the chamfered portions 31c, and is then diffused in the interior of the light guide plate 31. Therefore, almost all of the light emitted from the LEDs 30 can be diffused in the light guide plate 31 and effectively utilized.

As shown in FIGS. 5 and 6, the front cover 34 and the rear cover 35 are such that the LEDs 30, the light guide plate 31, the collimator lens 33, the spacer 36, and so forth are installed in the internal space formed between the front and rear covers 34 and 35. As shown in FIG. 4, the front cover 34 has a substantially triangular opening 34a formed to match the shape of the key top 22 on the button unit 41 side.

Consequently, the light emitted from the upper surface 31b of the light guide plate 31 can be emitted through the opening 34a to the button unit 41 side.

As shown in FIGS. 5 and 6, the spacer 36 is provided between the lower surface 31a of the light guide plate 31 and the upper surface of the LED substrate 30a, and has a thickness corresponding to a specific gap so that the upper surface of the LED substrate 30a is mounted in a state of having a specific gap from the lower surface 31a of the light guide plate 31.

Layout Structure of Push Button 20

As described above, the gaming device 1 in this embodiment comprises the housing 2, an operation button 20 for a gaming machine 1 provided in a front position opposite a game player in the housing 2 and the LCD 11 disposed at a position adjacent to the operation button for the gaming machine in the housing. The operation button 20 includes the base 21, the key top 22, the LEDs 30, and the light guide plate 31, as shown in FIG. 5, etc. The key top 22 is supported by the base 21 in a state that allows it to be pressed down by the player, and is optically transmissive. The LEDs 30 are provided under the key top 22 and emit light in the desired direction. The light guide plate 31 is provided under the key top 22, and has the lower surface 31a on which the light emitted from the LEDs 30 is incident, and an upper surface 31b that emits light to the key top 22 side.

Consequently, the configuration is simpler than when a liquid crystal display device is provided under the key top 22, and this allows a design or the like to be displayed on the surface of the key top 22 of the push button 20.

As a result, it is possible to provide a push button 20 that allows the cost of the gaming machine 1 to be lower than in the past.

Also, with the push button 20 in this embodiment, the light guide plate 31 further has the upper surface 31b that is opposite the key top 22, and the lower surface 31a that is on the opposite side from the upper surface 31b. The LEDs 30 are disposed on the lower surface 31a side of the light guide plate 31.

Consequently, light from the LEDs 30 can be emitted toward the lower surface 31a of the light guide plate 31, so the push button 20 can be reduced in width as compared to a configuration in which the LEDs 30 emit light from the side surfaces of the light guide plate 31.

As a result, for example, the push button can be disposed at a position closer to the LCD (liquid crystal display device) 11 disposed at a position adjacent to the operation deck 10 of the gaming machine 1.

Also, with the push button 20 in this embodiment, the light guide plate 31 further has a plurality of the prisms 32 that are arranged on the lower surface 31a along a specific pattern, and that reflect the light emitted from the LEDs 30 onto the lower surface 31a in a specific direction.

Consequently, the light incident on the lower surface 31a from the LEDs 30 is reflected by the prisms 32 inside the light guide plate 31, and is emitted from the upper surface 31b, allowing a design or the like to be displayed on the surface of the key top 22.

Also, with the push button 20 in this embodiment, the prisms 32 have a plurality of patterns so that the design displayed on the surface of the key top 22 can be switched according to the incidence direction of the light emitted from the LEDs 30.

Consequently, for example, if the LEDs 30 that emit the light incident on the light guide plate 31 are switched, the direction of the light incident on the light guide plate 31 can be switched, and a different design can be displayed on the surface of the key top 22 of the push button 20.

Also, with the push button 20 in this embodiment, the light guide plate 31 further has the chamfered portions 31c that are formed along the sides of the upper surface 31b, reflect the light emitted from the LEDs 30, and guide the reflected light so as to be diffused between the upper surface 31b and the lower surface 31a.

Consequently, in a configuration in which the LEDs 30 are disposed on the lower surface 31a side of the light guide plate 31, the light can be sufficiently diffused inside the light guide plate 31, and substantially uniform light can be emitted from the upper surface 31b.

Also, the push button 20 in this embodiment further comprises the collimator lens 33 that is disposed between the lower surface 31a of the light guide plate 31 and the LEDs 30, and guides the light emitted from the LEDs 30 from the lower surface 31a side of the light guide plate 31 to the chamfered portions 31c.

Consequently, the light directed at the chamfered portions 31c formed on the light guide plate 31 by the collimator lens 33 is reflected into the light guide plate 31 by the inclined surfaces of the chamfered portions 31c, diffused inside the light guide plate 31, and then emitted from the emission surface (upper surface 31b) in a substantially uniform state.

Also, the push button 20 in this embodiment further comprises the LED substrate 30a on which the LEDs 30 are installed and disposed so as to be opposite the lower surface 31a of the light guide plate 31.

Consequently, the LED substrate 30a on which the LEDs 30 are provided is also disposed on the lower surface 31a side rather than to the side of the light guide plate 31, so the width of the push button 20 can be reduced.

With the push button 20 in this embodiment, as discussed above, the LEDs 30, the light guide plate 31, the collimator lens 33, and so forth are disposed in the space under the button unit 41, which allows the width of the push button 20 to be smaller than in the past.

Here, in the case of a slot machine or other such gaming machine 1, the operation deck 10 is more limited in width than in depth. Therefore, as in this embodiment, if the components on the display unit 42 side are disposed in a vertical orientation in the up and down direction of the button unit 41, this reduces the external size of the push button 20 in the width direction, which allows the push button to be disposed at a position close to the display device (such as the LCD 11) in the operation deck 10.

Other Embodiments

An embodiment of the present invention was described above, but the present invention is not limited to or by the above embodiment, and various modifications can be made without departing from the gist of the invention.

A

In the above embodiment, a push button type of operation button (the push button 20) was described as an example of the operation button for a gaming machine of the present invention, but the present invention is not limited to this.

For example, the operation button does not have to be a push button type, and an operation button featuring some other method, such as a rotary operation type, a cross key type, a touch panel type, or a vibration transmission type, may instead be used as the operation button for a gaming machine.

Also, the shape of the operation button is not limited to a substantially triangular shape, and may instead be some other shape, such as a substantially circular shape or a polygonal shape, including substantially square.

(B)

In the above embodiment, an example was given in which the LEDs 30 serving as the light source were disposed on the lower surface 31a side of the light guide plate 31, but the present invention is not limited to this.

Figure 10:
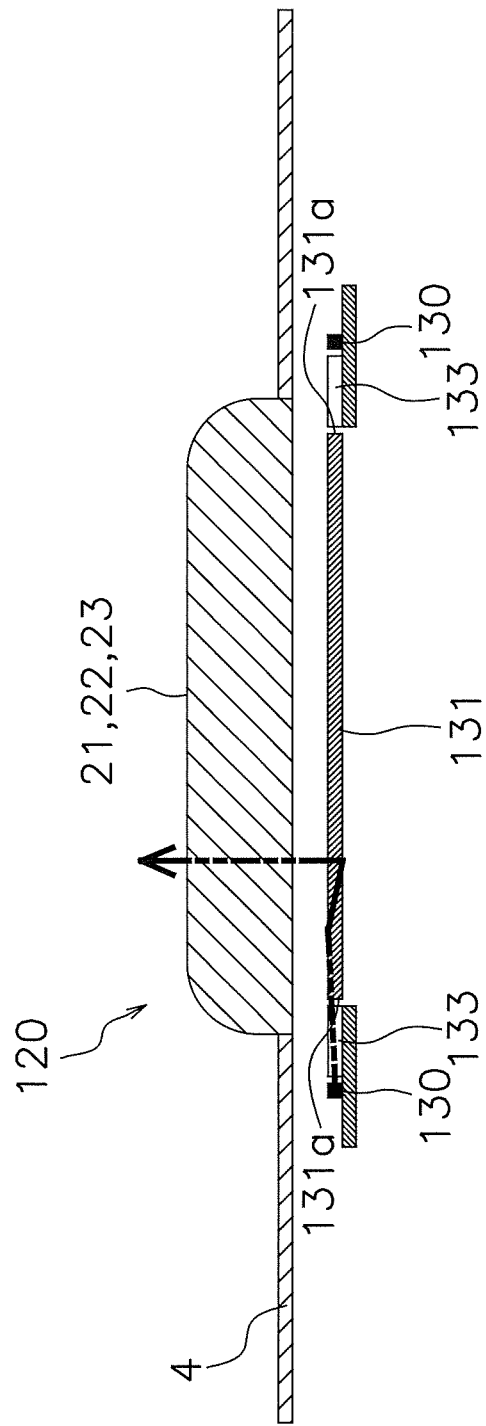
FIG. 10 is a cross-sectional view of the configuration of a push button for a gaming machine according to another embodiment of the present invention.

For example, as shown in FIG. 10, the configuration may be such that LEDs (light source) 130 are disposed on the side surfaces (end surfaces) 131a side of a light guide plate 131.

In this case, the control unit (not shown) of the gaming machine switches the plurality of LEDs 130, which are disposed so as to emit light at the side surfaces (end surfaces) 131a of the light guide plate 131, on or off for each direction. Switching the incidence direction of the light incident on the light guide plate 131 via the collimator lens (lens unit) 133 allows a plurality of patterns of prisms provided to the light guide plate 131 to reflect the light in a specific direction, so that the design displayed on the surface of a push a button 120 can be switched.

(C)

In the above embodiment, an example was given in which the chamfered portions 31c were provided along the four sides of the upper surface 31b of the substantially square light guide plate 31 in order to diffuse the light incident from the lower surface 31a side inside the light guide plate 31, but the present invention is not limited to this.

For example, of the four sides of the upper surface of the substantially square light guide plate, a chamfered portion may be provided along only one side, only two sides, or three sides.

(D)

In the above embodiment, an example was given in which the light guide plate 31 had a substantially square upper surface 31b, but the present invention is not limited to this.

For example, the shape of the upper surface of the light guide plate is not limited to being substantially square, and may instead be polygonal or have a substantially circular shape.

In this case, the chamfered portions formed on the light guide plate may be provided at specific positions according to the incidence position of the light.

(E)

In the above embodiment, an example was given in which the light emitted from the LEDs 30 was reflected by the prisms 32 provided to the light guide plate 31, so that the desired design "A" was displayed on the surface of the key top 22, but the present invention is not limited to this.

For example, the design displayed by the reflection of the prisms may be any of various graphics, such as a picture of a character that appears in the gaming machine, in addition to a letter such as A.

(F)

In the above embodiment, an example was given in which the collimator lens 33 was provided for guiding the light emitted from the LEDs 30 into the light guide plate 31, but the present invention is not limited to this.

For example, with a configuration in which the LEDs emit light from the side surfaces (end faces) of the light guide plate, the collimator lens may be eliminated.

(G)

In the above embodiment, an example was given in which the LED substrate 30a on which the LEDs 30 (serving as the light source) were fixed was disposed on the lower surface 31a side of the light guide plate 31, but the present invention is not limited to this. For example, the substrate on which LEDs or another such light source are disposed may be disposed to the side of the light guide plate, rather than on the lower surface side of the light guide plate.

(H)

In the above embodiment, an example was given in which an LCD (liquid crystal display) 11 was used as a display device disposed adjacent to the push button 20 in the operation deck 10, but the present invention is not limited to this.

For example, instead of an LCD, some other display device may be installed, such as an organic EL (electroluminescence) display device.

(I)

In the above embodiment, an example was given in which the gaming machine 1 to which the present invention is applied was a slot machine, but the present invention is not limited to this.

For example, the gaming machine to which the present invention is applied may be a pachinko machine, a playing card gaming machine for poker or the like, or a gaming machine for mahjong or the like, rather than a slot machine.

INDUSTRIAL APPLICABILITY

The gaming machine of the present invention exhibits the effect of reducing the cost of a gaming machine as compared with a conventional button, and as such can be widely applied to various gaming machines such as slot machines, pachinko machines, and various other gaming machines.

REFERENCE SIGNS LIST 1 gaming machine
2 housing
3 display monitor
4 transparent plate
10 operation deck
11 LCD (liquid crystal display)
20 push button (operation button for a gaming machine)
21 base
22 key top (main body)
22a front surface (first surface)
22b rear surface (second side)
23 bezel
24 elastic body
25 pressing sensor
26 rear cover
27 return spring
30 LED (light source)
30a LED substrate (substrate)
31 light guide plate
31a bottom surface (incident surface)
31b upper surface (emission surface)
31c chamfered portion
32 prism
33 collimator lens (lens portion)
34 front cover
34a opening
35 rear cover
36 spacer
41 button unit
42 display unit
120 push button (operation button for a gaming machine)
130 LED (light source)
131 light guide plate
131a side surface (end face)
133 collimator lens (lens portion)

The invention claimed is:

1. A gaming machine, comprising:
a housing;
a push button for a gaming machine provided in a front position opposite a game player in the housing; and
a display device disposed at a position adjacent to the operation button for the gaming machine in the housing, and
the operation button for the gaming machine includes:
a base;
a main body that is supported by the base in a state of being operable by a player, has a first surface that is visible to the player and a second surface on an opposite side from the first surface, and is configured to transmit light;
a light source that is provided on a side of the second surface of the main body and is configured to emit light in a desired direction; and
a light guide plate that is provided on the side of the second surface of the main body and has an incident surface on which light emitted from the light source is incident, and an emission surface from which light is emitted to a side of the main body.

2. The gaming machine according to claim 1, wherein the light guide plate further has an upper surface that is opposite the second surface of the main body, and a lower surface that is on an opposite side from the upper surface, and
the light source is disposed on a side of the lower surface of the light guide plate.

3. The gaming machine according to claim 2, wherein the light guide plate further has a plurality of prisms that are arranged in a specific pattern on either the upper surface or the lower surface, and that is configured to reflect the light emitted from the light source onto the incident surface in a specific direction.

4. The gaming machine according to claim 3, wherein the plurality of prisms have a plurality of patterns so as to switch a design displayed on the first surface of the main body according to an incident direction of the light emitted from the light source.

5. The gaming machine according to claim 2, wherein the light guide plate further has chamfered portions that are formed along sides of the upper surface, and that is configured to reflect the light emitted from the light source and guide a reflected light so as to diffuse the light between the upper surface and the lower surface.

6. The gaming machine according to claim 5, further comprising a lens portion that is disposed between the light source and the lower surface of the light guide plate, and that is configured to guide the light emitted from the light source from the side of the lower surface of the light guide plate toward the chamfered portions.

7. The gaming machine according to claim 2, further comprising a substrate that has a first surface on which the light source is installed, and that is disposed so as to be opposite the lower surface of the light guide plate.

8. The gaming machine according to claim 1, wherein the main body is supported by the base in a state that allows a transition from an initial state to a pressed state when the main body is pressed down with respect to the base.

9. The gaming machine according to claim 8, further comprising a spring member that is provided between the base and the main body, and that is configured to return the main body that has been pressed down with respect to the base from a pressed-down state to the initial state.

10. The gaming machine according to claim 1, wherein the display device is a liquid crystal display (LCD).

* * * * *

UNITED STATES PATENT AND TRADEMARK OFFICE
CERTIFICATE OF CORRECTION

| | | |
|---|---|---|
| PATENT NO. | : 12,175,828 B2 | Page 1 of 1 |
| APPLICATION NO. | : 17/889453 | |
| DATED | : December 24, 2024 | |
| INVENTOR(S) | : Takuya Kudo | |

It is certified that error appears in the above-identified patent and that said Letters Patent is hereby corrected as shown below:

On the Title Page

Foreign Application Priority Data should be inserted as shown below:
--(30) Foreign Application Priority Data
September 15, 2021 (JP)............................ 2021-149812--

Signed and Sealed this
Twenty-fifth Day of February, 2025

Coke Morgan Stewart
*Acting Director of the United States Patent and Trademark Office*